L. SCHULZE.
BEER COOLER.

No. 83,099.        Patented Oct. 13, 1868

Witnesses
Samuel Smith
William Hansleben

Inventor
Louis Schulze
By Alex. A. C. Klaucke
his Attorneys

2 Sheets—Sheet 2.
L. SCHULZE.
BEER COOLER.
No. 83,099.          Patented Oct. 13, 1868.
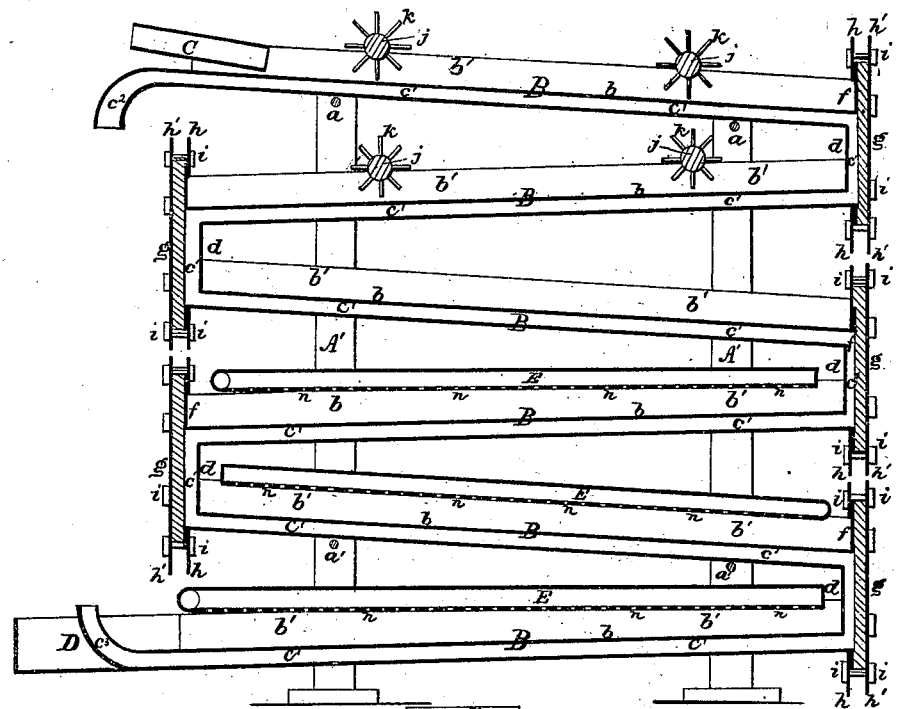
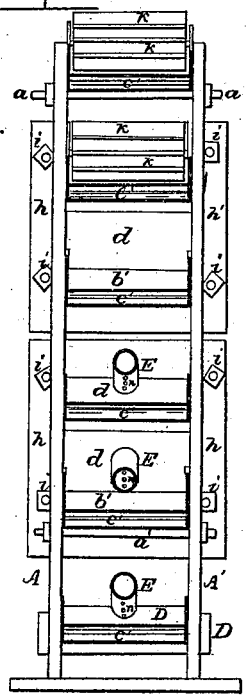
Witnesses.
Samuel Smith
William Kensleter
Inventor.
Louis Schulze
By Alex. A. C. Klauckerle
his Attorneys

LOUIS SCHULZE, OF LOUISVILLE, KENTUCKY.

Letters Patent No. 83,099, dated October 13, 1868.

IMPROVED BEER-COOLER.

The Schedule referred to in these Letters Patent and making part of the same.

*To all whom it may concern:*

Be it known that I, LOUIS SCHULZE, of Louisville, in the county of Jefferson, and State of Kentucky, have invented a new and useful Improvements in Beer-Coolers; and I do hereby declare the following to be a full and correct description of the same, sufficient to enable others skilled in the art to which my invention appertains to fully understand and construct the same, reference being had to the accompanying drawings, which make part of this specification, and in which—

Figure 2 is a longitudinal vertical section of the main part; and

Figure 1:
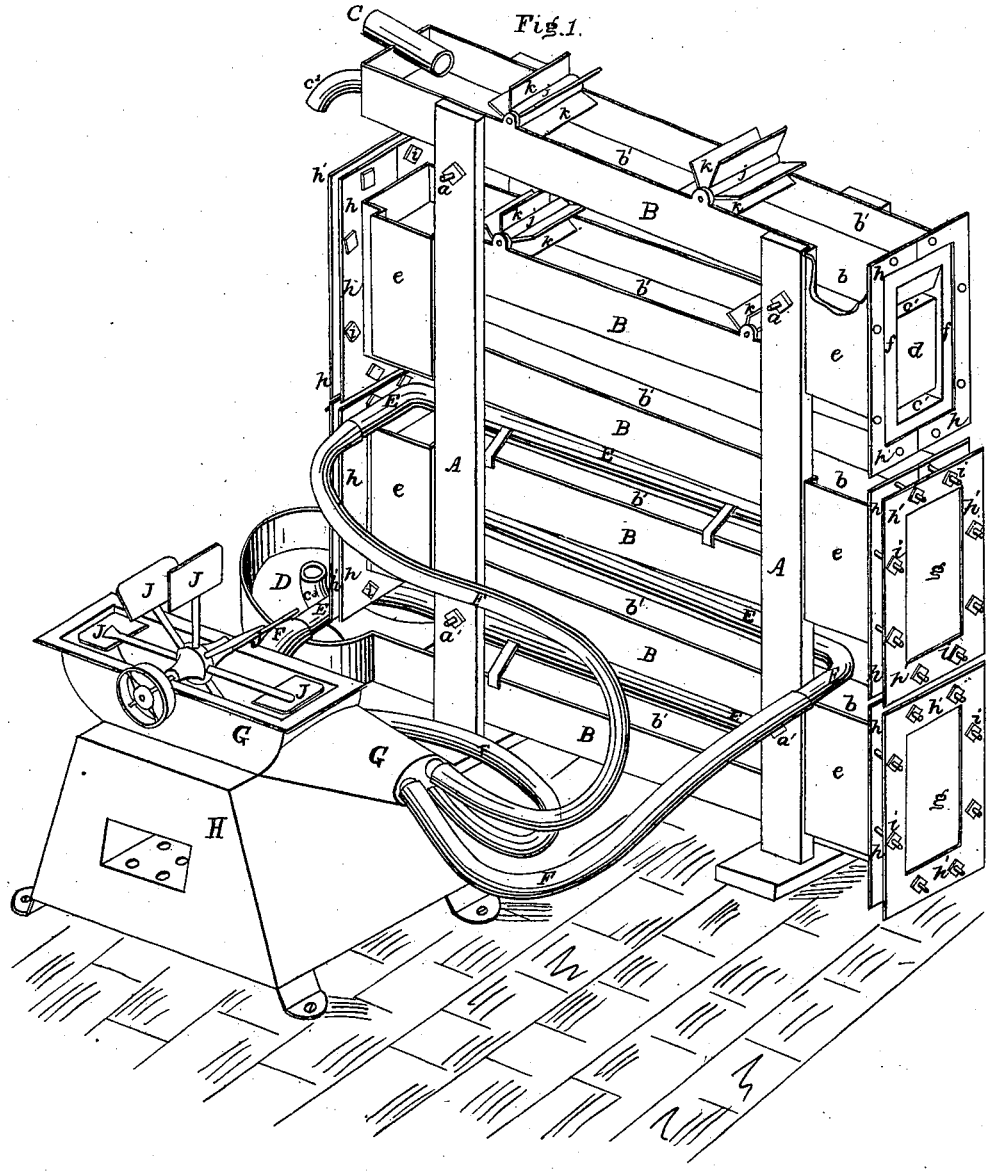
Figure 1 is a perspective view of my improved apparatus.

Figure 3 a vertical cross-section of the same.

Like letters of reference indicate like parts in the several figures.

The principal requirement of a beer-cooler is to give the broadest possible surface for the beer to pass over, to allow it to spread, with the smallest possible depth of the pipe through which the water flows in the opposite direction to the beer, so as to quickly pass the water through the pipes, and keep up a rapid circulation, for the quicker the circulation, the greater is the cooling-effect.

In beer-coolers as now constructed, the pipes are all rounded, which necessitates that the beer in the longitudinal centre of the pipe through which it runs, and where it is deeper than at the sides, does not cool off as quick as at the sides, and consequently the whole mass of the beer is not only unevenly cooled, but parts of the beer are never exposed to the influences of the cold.

Again, in beer-coolers in which the beer is run through pipes, with water running in opposite direction below it, the pipes incrustate very quickly with the impurities of the water, and the pipes soon are either stopped up or eaten away by the salts forming on them, by reason of their not being cleansed, which, with their present construction, is impossible.

Air has been applied to assist in cooling the beer when water is used; but the blast has always been a one-sided one; that is to say, it either strikes the beer in the direction of its flow, and consequently only touches its surface, or it strikes the beer against its flow, and spatters it all over.

I obviate all these difficulties by my improved apparatus, by means of which I can cool beer, in summer-time, to such a degree that it can be at once used.

I have cooled beer with my apparatus in the latter part of August, down to 30°, or almost the degree of cold of ice-water, which is more than required, 42° being all that is needed, so that I need not manufacture my beer for summer-use in winter, and store it up, but can make it in summer as well as in cold weather, and, passing it through my improved cooler, ender it fit at once for use.

And the nature of my invention consists in—

First, the construction of the channels through which the beer runs in one direction, and the water in the opposite one, with square bottom and sides, so that the beer can spread over the surface of the channel, and an equal surface of water touches the under side of the channel in such a manner that the stream of beer is of equal thickness, and is exposed all the way, until it is discharged, to an equal surface of equal thickness of the cooling-liquid.

Second, the mode of forming the water-channel open at both ends, and making it continuous by means of a peculiar packing, hereinafter described, so that easy access can be had to the same for the purpose of cleaning it.

Third, the application, for cooling the beer as it runs down the channels, in addition to the water, of contents of atmospheric air, passed over ice by a fan, or equivalent means, said currents striking the beer at vertical right angles, permeating, stirring, and turning it at the same time.

Fourth, the construction and application of stirring and turning-devices, by means of which the beer is turned and stirred so that all its particles come in contact with the cooling-surface.

Fifth, the construction of different parts of the apparatus, as hereinafter more fully described.

A A A' A', in the drawings, represent four standards or posts, secured to each other by means of bars $a$ $a'$. Between these parts are secured, in any suitable manner, inclined in opposite directions to each other, the pipes or channels B, each one having a double bottom, $b$, thus forming two separate channels, $b'$ and $c'$, the former serving for the hot beer to be cooled, and the latter for the water.

The channels B are constructed with square sides and bottom, and are connected to each other, at their ends, by means of end-plates $d$ and by side-plates $e$, which latter form a continuation of the channels $b'$ in such a manner that the beer runs from the top channel to the lowest channel into the discharge-vat in one continuous stream. The ends of the water-channels $c'$ of each contiguous pair of channels, B, are thus left open, as shown in the two upper channels, B, fig. 1, the packing which forms their continuation being removed.

A flange, $f$, is formed on the contiguous ends of channels B, against which is placed a wooden packing or plate, $g$, which is held in place by two iron frames, $h$ $h'$, secured to each other by screw-bolts and nuts $i$, as shown, the frames $h$ being formed in two pieces, and placed in the rear of flanges $f$. Thus, when the packing is removed, easy access is had to the water-channels $c'$ for the purpose of cleaning or repairing.

C is a pipe, connecting with the vats from which the beer is run into the channels $b'$.

The upper and lower ends of channels $c'$ terminate in pipes or tubes $c^1$ and $c^2$, the former serving for a discharge-pipe of the water, and the latter to be attached to a force-pump, or a strong head of water, higher than the apparatus, to force water through the channel $c^1$.

The lower end of channel $b'$ terminates in a receiving-vat or receptacle, D, from which the beer may be run off into barrels, or otherwise disposed of for use.

In suitable bearings, on the sides of the two upper channels, $b'$, are pivoted rollers $j$, provided with paddles $k$, which latter just clear the bottom of $b'$ when the shafts are turned. These rollers and paddles are moved by the beer as it runs down these channels, and by them the beer is turned and stirred several times, so as to expose all its parts to the cooling-surface before it runs into the lower channels.

Over the three lower channels, $b'$, secured in any suitable manner, are suspended pipes E, closed at one end, and connected at the other, by means of flexible tubes F, to the mouth of a blower or fan, G, which is situated over an ice-box or receptacle, H, having a perforated bottom. The fan is provided with paddles J, and is provided with a cover. The under side of pipes E is perforated, as shown at $n$, and the pipes run parallel with their respective channels $b'$.

The operation of the apparatus is as follows.

Water is forced into the channel $c^1$ by a force-pump or any other suitable means. The beer is then allowed to run into the channel $b'$, passing from end to end, the water running in opposite directions. As the latter passes from pipe to pipe, or channel to channel, it touches, on the inside, the plates $d$, which, not coming in contact with the hot beer, are always comparatively cool; and on the outside it comes in contact with the wooden packing $g$, which, being a non-conductor of heat, imparts no heat to the water, though it touches the ends of the channels $b'$. Thus, the water mounting from channel to channel, loses none of its cooling-power during the interval in which it does not touch the double bottom $b$.

The channels $b'$ $c^1$ being square in shape, the beer and the water always are each of equal depth or thickness in the entire channel, and thus each part of the beer is exposed to equal cooling-surface of water.

The paddles $k$ are moved by the beer as it runs down channel $b'$, and stir and turn the beer, so that every particle of it is exposed to the cooling-surface before it runs into the lower channels. When it passes through the last three channels $b'$, it is exposed to currents of cold air, drawn up through the ice-box H, and forced into the pipes E, through tubes F, by means of fan G. These ice-cold currents of air striking the current of beer at right angles, thoroughly permeate it, and stir it powerfully, so that each particle of the beer comes in contact with the cold air. By this means, the beer, when it arrives at the receiving-vat D, is not only perfectly cooled, but actually cold.

Having thus described my invention,

What I claim as new and desire to secure by Letters Patent, is—

1. A beer-cooling apparatus, consisting of a series of contiguous and connecting double-bottomed pipes or channels, one above another, in vertical line, and inclined towards each other, when said pipes or channels are made with square sides and bottoms, substantially as and for the purposes set forth.

2. A beer-cooling apparatus, consisting of a series of contiguous and connecting double-bottomed pipes or channels, one above the other, in vertical line, the water-channels of which, at the contiguous ends, are so constructed that they can be opened, substantially as and for the purposes set forth.

3. A beer-cooling apparatus, consisting of a series of contiguous and connecting double-bottomed pipes or channels, one above the other, in vertical line, the water-channels of which, at contiguous ends, are closed by a packing of water-proof material, non-conductor of heat, substantially as and for the purposes described.

4. In a beer-cooling apparatus, the application, in combination with water for cooling-purposes, of a blast of air which has been passed over ice, and strikes the beer at right angles to its flow, substantially as and for the purposes set forth.

5. The combination, in a beer-cooler, of the double-bottomed channels B, with perforated air-pipes E, substantially as and for the purposes set forth.

6. The combination, in a beer-cooler, of the rollers $j$, provided with paddles $k$, with the double-bottomed channels B, substantially as and for the purposes described.

LOUIS SCHULZE.

Witnesses:
SAMUEL SMITH,
WILLIAM WANSLEBEN.